J. G. ROY.
MILK HEATER.
APPLICATION FILED JULY 27, 1914.
1,144,868.
Patented June 29, 1915.
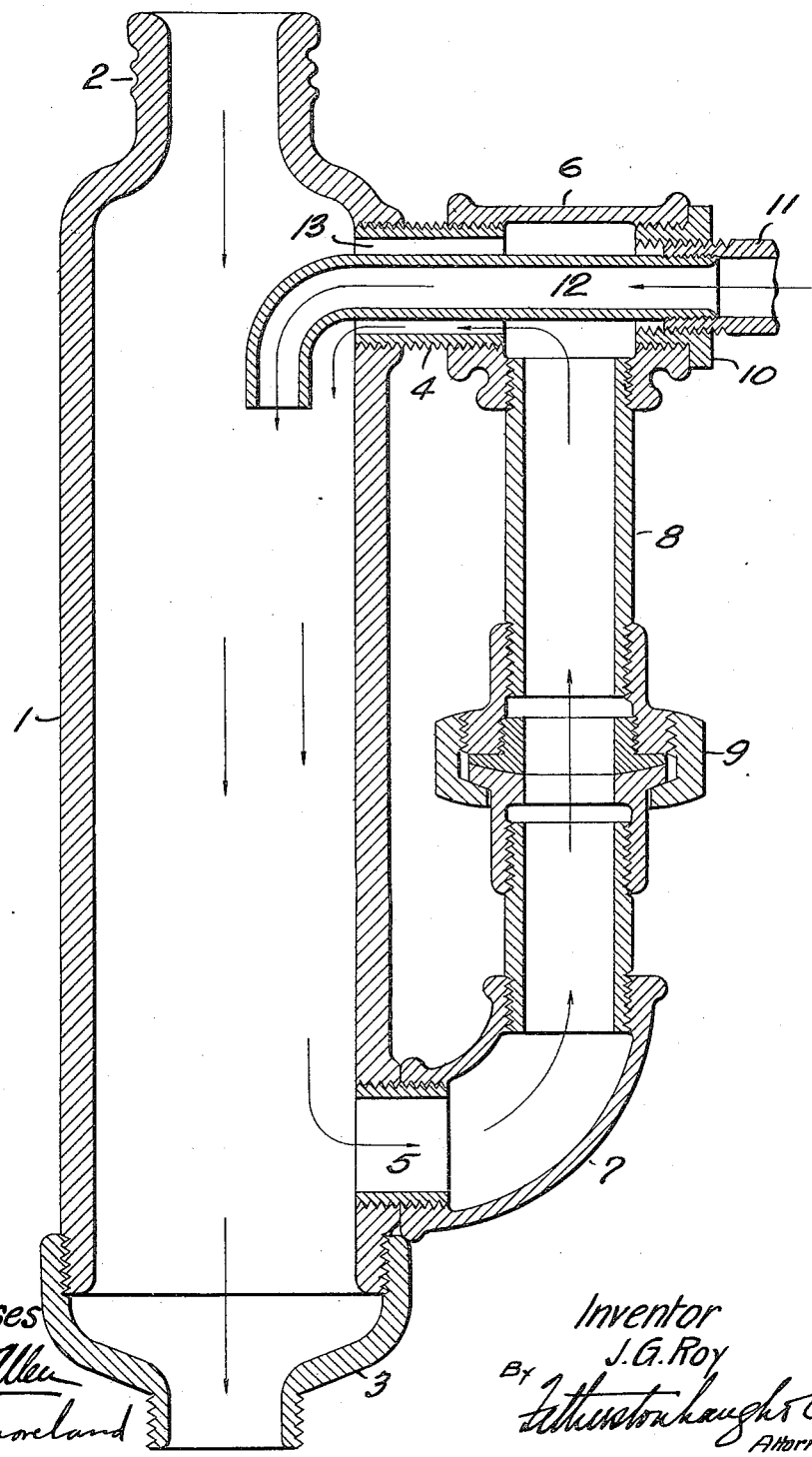
Witnesses
S. R. W. Allen
G. M. Moreland
Inventor
J. G. Roy
By Fetherstonhaugh & Co
Attorneys

UNITED STATES PATENT OFFICE.

JEAN GUSTAVE ROY, OF CAP CHAT, QUEBEC, CANADA.

MILK-HEATER.

1,144,868.  Specification of Letters Patent.  Patented June 29, 1915.

Application filed July 27, 1914. Serial No. 853,560.

*To all whom it may concern:*

Be it known that I, JEAN GUSTAVE ROY, a citizen of the Dominion of Canada, and resident of Cap Chat, in the Province of Quebec and Dominion of Canada, have invented certain new and useful Improvements in Milk-Heaters, of which the following is a full, clear, and exact description.

This invention relates to improvements in milk heating apparatus, and the object is to provide a simple, efficient and sanitary means for heating milk in butter factories and the like.

A further object is to provide a device which will heat the milk to any desired temperature without imparting a cooked taste thereto.

In butter factories where the cream is skimmed from the milk by means of centrifugal machines known as separators, it has been found that cold milk does not skim to the best advantage, and it is therefore advisable to heat the milk to a uniform temperature before delivering same to the separator. This heating must, however, be done so quickly that the fat globules have not time to be affected. Otherwise, the skim will be imperfect. Furthermore, the milk must not be boiled or acquire a cooked taste, as this would render the milk unfit for use afterward.

To accomplish the above objects, I provide a tubular body through which the milk flows having a steam inlet pipe at the top and an outlet at the bottom, extending upwardly to and surrounding the steam inlet.

The drawing which illustrates the invention is a vertical sectional view of the device.

Referring more particularly to this drawing, 1 designates a tubular body having at the top a corrugated neck 2 for the attachment of a supply hose or the like, and at the bottom, a cap 3 which may be readily unscrewed so as to expose the whole inner surface of the body. Near the top and bottom of the body, radially extending nipples 4 and 5 are screwed thereinto, the upper nipple carrying a T 6 and the lower an elbow 7. The arm of the T is connected to the elbow by means of a pipe 8, a union or right and left buckle 9 being inserted in the pipe 8 to render the assembly possible and permit easy disconnection. The remaining arm of the T 6 is provided with a reducer 10 into which is screwed a steam pipe 11. The end of the steam pipe carries a nozzle 12, which passes through the T and nipple 4 into the body 1 and is turned downwardly, as clearly shown. This nozzle is of such size that an annular passage 13 is left between the same and the nipple 4.

The operation of the device is extremely simple. Milk is delivered into the top of the body and the steam turned on. The rush of steam and milk through the body past the annular passage 13 produces a partial vacuum in the pipe 8, which draws a mixture of milk and steam into this pipe. This mixture then passes out through the annular passage into the body and mingles with the cold milk. The body being of larger diameter than the supply and discharge pipes therefor, the volume of milk is considerable, and owing to the rapid circulation, the milk and steam becomes mixed with cold milk and passes on out of the body, the actual contact of the milk and steam being so short that the milk does not acquire a cooked taste nor are the fat globules in any way affected. The circulation of milk through the pipe 8 and around the nozzle also overcomes any possible action of the steam jet as an injector operating to hasten the flow of milk. It will be obvious that when steam is the heating agent and is injected into the cold milk, rapid condensation of the steam will tend to produce partial vacua, into which the milk will rush, thus producing a gurgling or hammering. The supply of already heated milk along with the steam retards the condensation, and also provides a supply of liquid which will fill the vacuum more readily than the colder liquid, and thus eliminate all noise in the operation of the device and insure a uniform rate of flow.

The device is very easily assembled or taken apart, so that it may be washed or sterilized with great ease, and is thus very sanitary. In addition, the heater is already connected to the steam pipe and after a rinsing may be thoroughly sterilized by blowing steam therethrough. There are no extremely hot surfaces so that the milk will not stick to any portion of the device. The distribution of the steam through the milk is so uniform and perfect that the milk will not boil, but may nevertheless be heated almost instantly from 30° to 100° Fahrenheit.

Having thus described my invention, what I claim is:—

1. A device of the character described, comprising a body, a passage leading from the bottom to the top thereof, a steam pipe entering the body through the upper end of said passage and forming with the wall of the passage an annular orifice, the end of said steam pipe within the body being turned downwardly.

2. A device of the character described, comprising a body, enlarged intermediate its ends and adapted for a flow of liquid therethrough, means for injecting a heating agent into the body in substantially the direction of liquid flow, and means for abstracting a portion of the mixed liquid and heating agent and delivering same into the body adjacent the point of entrance of the heating agent.

3. In a device of the character described, a body arranged for the mixing of a liquid and a heating agent, and means for delivering a portion of the heated liquid into the cold liquid simultaneously with the heating agent.

4. A device of the character described comprising a body, enlarged intermediate its ends, a T secured adjacent the inlet end of said body, a conduit for a heating agent passing through said T and discharging into the body and forming with the T an annular passage communicating with the body, and a pipe connecting the opposite end of the body with said annular passage.

In witness whereof, I have hereunto set my hand, in the presence of two witnesses.

JEAN GUSTAVE ROY.

Witnesses:
 Louis Côté,
 Urlain Chrétien.

Copies of this patent may be obtained for five cents each, by addressing the "Commissioner of Patents, Washington, D. C."